United States Patent [19]
Halter

[11] 3,838,254
[45] Sept. 24, 1974

[54] EXTENSOMETER WITH UPDATING AT INTERVALS INDEPENDENT OF STRIP SPEED

[75] Inventor: Allan C. Halter, Milwaukee, Wis.

[73] Assignee: Allis-Chalmers Corporation, Milwaukee, Wis.

[22] Filed: Sept. 27, 1972

[21] Appl. No.: 292,793

[52] U.S. Cl..... 235/92 DN, 235/92 PE, 235/92 CC, 235/92 CA, 235/92 R, 235/103.5 E
[51] Int. Cl............................................. B21c 51/00
[58] Field of Search....... 235/92 DN, 92 PD, 92 PE, 235/92 CC, 92 CA, 92 DM, 103.5 E; 324/161

[56] References Cited
UNITED STATES PATENTS

| | | | |
|---|---|---|---|
| 3,139,236 | 6/1964 | Canova et al. | 235/103.5 E |
| 3,537,002 | 10/1970 | Haner et al. | 324/161 |

Primary Examiner—Gareth D. Shaw
Assistant Examiner—Joseph M. Thesz, Jr.
Attorney, Agent, or Firm—Lee H. Kaiser

[57] ABSTRACT

A steel strip engages entry and exit rolls in passing through a rolling mill, pulses from entry and exit pulse tachometers driven by the entry and exit rolls are accumulated in entry and exit counters respectively, and the amount of extension of the strip is determined by repeatedly accumulating in a presettable extension measuring counter the pulses from a pulse clock, stopping the exit counter and resetting the extension measuring counter to zero after the preset number of pulses have been accumulated, continuing to accumulate pulses in the entry and extension measuring counters, and upon coincidence of counts stored in the entry and exit counters, reading out the number of clock pulses accumulated in the extension measuring counter in the period between stopping of the exit counter and coincidence of counts in the entry and exit counters as an indication of the percent extension of the strip.

15 Claims, 1 Drawing Figure

PATENTED SEP 24 1974
3,838,254
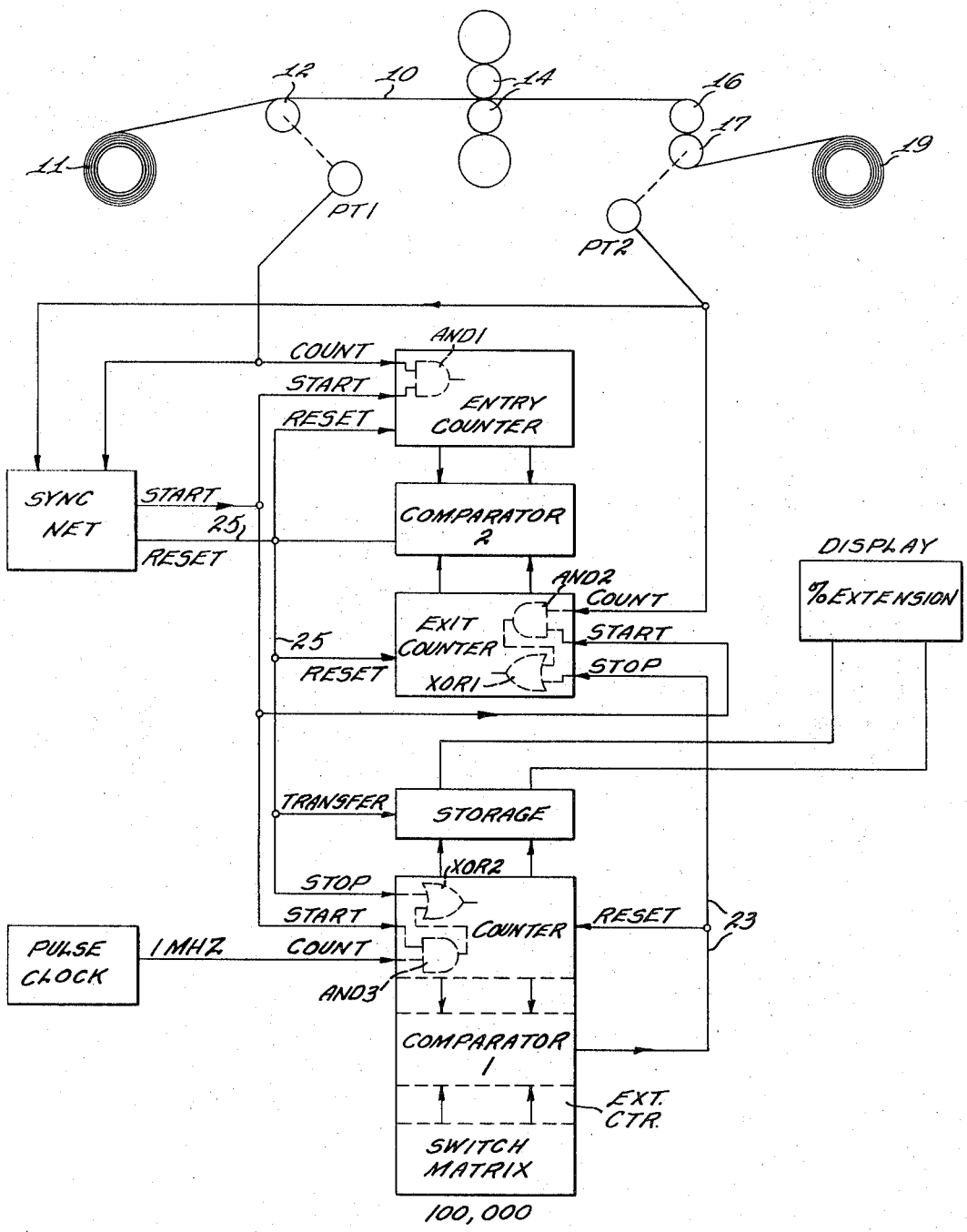

EXTENSOMETER WITH UPDATING AT INTERVALS INDEPENDENT OF STRIP SPEED

This invention relates to an extensometer for measuring the length of a steel strip being rolled.

BACKGROUND OF THE INVENTION

Digital extensometers are known which determine the amount of elongation of a cold rolled strip as it passes between the work rolls of a reduction mill by measuring the difference between the speed of rotation of a roll driven at exit speed and a roll driven at entry speed using pulse tachometers geared to two contact rolls at the entry and exit sides of the mill. The pulse tachometers derive electrical pulses at a frequency which is a function of the speed of rotation of the contact rolls. The exit roll rotates faster than the entry roll due to reduction in strip thickness, and extension is computed by counting the number of pulses produced by the exit roll pulse tachometer during the time required to accumulate a predetermined number of pulses from the entry pulse tachometer. In certain extensometers such as disclosed in U.S. Pat. Nos. 2,852,195 and 2,874,900, the less significant digits of the counter on the exit side provide a direct indication of the percent extension of the steel strip.

Known extensometers require that a pulse tachometer count up to a predetermined level before the extension indication can be updated. Known extensometers require that a relatively large count (for example 10,000) be accumulated for each update. This is satisfactory at high strip speeds where the pulse rate may be in the range from 15 KHz to 20 KHz. However, known extensometers wherein the sample time is based upon a predetermined number of counts from a pulse tachometer have the disadvantage at lower line speeds, such as one-twentieth or less of line speed, that several seconds may elapse before an update signal is available. For continuous extension control, such delay between updating could result in considerable drift before corrective action can be taken.

SUMMARY OF THE INVENTION

In accordance with the invention, a strip passing through a reduction mill contacts entry and exit rolls prior to entry and subsequent to leaving the mill, pulses from entry and exit pulse tachometers driven by the entry and exit rolls are accumulated in entry and exit registers respectively, and the amount of extension is determined by repeatedly accumulating in a presettable extension measuring counter the pulses from a pulse clock, stopping the exit counter and resetting the presettable counter to zero after the preset number of pulses have been accumulated, continuing to accumulate pulses in the entry and presettable counters and, upon coincidence of counts stored in the entry and exit counters, reading out the number of clock pulses accumulated in the presettable counter in the period between stopping of the exit counter and coincidence of counts in the entry and exit counters as an indication of the amount of extension of the strip. In the preferred embodiment of extensometer and method of the invention, the frequency of the pulse clock is 1 MHz so that the number of clock pulses read out directly indicates the percent extension of the strip. The entry and exit registers are reset to zero and the presettable counter is stopped upon coincidence of count in the entry and exit counters and, subsequent to the read out step, counting by the entry and exit and presettable registers is simultaneously initiated with the number of pulses read out in the preceding sample already accumulated in the presettable extension measuring counter. In the preferred embodiment the read out step is accomplished by transferring the contents of the presettable counter to a storage register, and counting by the entry and exit and presettable registers is simultaneously started by a synchronizing pulse network when pulses from the entry and exit pulse tachometers are coincident.

OBJECTS OF THE INVENTION

It is an object of the invention to provide an improved extensometer and method of determining percent extension wherein the percent extension indication is updated at selected intervals as low as a fraction of a second irregardless of strip speed.

These and other objects and advantages of the invention will be more readily apparent from the following detailed description and attached drawing wherein the single FIGURE is a schematic view of an extensometer embodying the invention connected to a reduction mill.

DETAILED DESCRIPTION

Referring to the drawing, a steel strip 10 to be reduced passes from a coil 11 over a billy roll 12 and thorugh work rolls 14 of a rolling mill wherein it is reduced in thickness. The reduced strip 10 then passes over tension bridle rolls 16 and 17 and onto a coiler 19 so that tension is maintained throughout strip 10 from coil 11 to coiler 19. Billy roll 12 may be the entry contact roll and be coupled by suitable means to an entry pulse tachometer PT1, and bridle roll 17 may be the exit contact roll and be coupled by suitable means to an exit pulse tachometer PT2.

Pulse tachometer PT1 may be connected to the count input of an entry digital counter, or register of the binary or decimal or binary coded decimal (BCD) type shown in block form to count pulses from pulse tachometer PT1 driven by billy roll 12 at entry strip speed, and pulse tachometer PT2 may be coupled to the count input of an exit digital counter, or register similar to the entry counter to count pulses from pulse tachometer PT2 driven by bridle roll 17 at exit speed. It is schematically represented in the drawing that pulses applied to the COUNT input of the entry counter are coupled through an AND gate AND 1 shown in dotted lines to the flip-flop stages (not shown) and that pulses applied to the COUNT input of the exit counter are coupled through the serial arrangement of an AND gate AND 2 and an exclusive OR gate OR 1 shown in dotted lines to the flip-flop stages (not shown) of the counter. It is assumed herein that pulse tachometers PT1 and PT2 are identical and that the entry and exit rolls 12 and 17 are of the same size as that both rotate at the same speed when strip 10 is not being reduced. Both entry and exit pulse tachometers PT1 and PT2 are connected to a pulse synchronizing network SYNC NET shown in block form which determines when the pulses from the two pulse tachometers are coincident and may, in known manner, include a pair of one-shot multivibrators (not shown) and a gate (not shown) which receives the output pulses from the one-shot multivibrators and is opened when such pulses have a predetermined overlap.

A digital extension measuring counter, or register, EXT CTR similar to the entry and exit registers, shown in block form accumulates pulses from a conventional pulse clock shown in block form whose frequency is preferably 1.0 MHz. The extension measuring register EXT CTR is preferably of the presettable type and includes a plurality of flip-flop stages (not shown), a switch matrix shown in block form, and a comparator, or coincidence detector COMPARATOR 1, also shown in block form. It is schematically represented in the drawing that pulses applied to the COUNT input of the extension counter EXT CTR are coupled to the flip-flop stages through the serial arrangement of an AND gate AND 3 and an exclusive OR gate XOR 2 both of which are shown in dotted lines. The switch matrix may comprise a plurality of conventional thumbwheel computer-coded switches (not shown) of the type available from the Digitran Company of Pasadena, Calif. and permits selection of a desired number to which the extension measuring counter is preset, shown in the drawing as 100,000. The coincidence detector COMPARATOR 1 in known manner detects when the clock pulses accumulated in the extension measuring register EXT CTR are equal to the desired number of 100,000 preset in the switch matrix and then provides an output signal on a lead 23 which is connected to an input to the extension register EXT CTR designated RESET which, in known manner, may be coupled to the CLEAR input to all of the flip-flop stages and resets the extension measuring counter EXT CTR to zero. Lead 23 is also coupled to an input to the exit register designated STOP which is connected to one input of exclusive OR gate XOR 1 so that counting by the exit counter ceases when a signal is applied to lead 23. A coincidence detector COMPARATOR 2 is coupled to both the entry register and the exit register and detects when the counts accumulated in these two registers are equal and generates a signal over a lead 25 which is coupled to inputs designated RESET of both the entry register and the exit register so that they are reset to zero. Lead 25 is also coupled to an input designated RESET to the pulse synchronizing network SYNC NET and to an input designated STOP to the extension counter and also to a transfer input designated TRANSFER to a storage register STORAGE. The STOP input is schematically shown connected to one input to gate XOR 2 so that clock pulses applied to the other input to gate XOR 2 no longer pass to the flip-flop stages when a signal is applied to lead 25. The pulse applied to lead 25 by the coincidence detector COMPARATOR 2 resets the synchronizing network SYNC NET and transfers the contents of the extension register EXT CTR into the storage register STORAGE and stops the extension measuring register EXT CTR.

When pulses from the pulse tachometers PT1 and PT2 are coincident at the beginning of a new sample period, the pulse synchronizing network SYNC NET applies a signal to a START lead which is coupled to inputs designated START to the entry, exit and extension registers so that they begin to accumulate pulses. The START inputs are schematically shown connected to one input of gates AND 1, AND 2, AND 3 which receive pulses on their other input, thereby permitting counting to begin. When the extension register EXT CTR accumulates its preset count of 100,000 clock pulses, coincidence detector COMPARATOR 1 generates an output signal on lead 23 which disables gate XOR 1 and thus stops the exit register and also resets the extension measuring register EXT CTR to zero. The entry and extension measuring registers will continue to accumulate pulses from entry pulse tachometer PT 1 and the pulse clock respectively until coincidence detector COMPARATOR 2 detects coincidence between counts stored in the entry and exit registers. The coincidence detector COMPARATOR 2 then generates an output signal on lead 25 which is coupled to the TRANSFER input of the storage register STORAGE and transfers the contents of the extension measuring register EXT CTR to the storage register STORAGE, resets the entry and exit registers to zero, and stops the extension counter EXT CTR with a clock pulse count which represents the percent extension of strip 10 in the working rolls 14 of the reduction mill. The count stored in the storage register STORAGE may be read out and displayed on a visual read out indicator DISPLAY as a direct reading of percent extension. Although the preferred embodiment is shown with a visual read out device DISPLAY, it will be appreciated that the count indicating percent extension held in the register STORAGE may also be used to regulate auxiliary apparatus such as extension control means for work rolls 14, and the term "read out" is used hereinafter in the description and appended claims to connote either visual representation of the count held in the extension measuring counter EXT CTR or the register STORAGE or transferring, or sensing the signals representing such count. Assume for the purpose of description that the frequency of the pulse clock is 1.0 MHz, and that a length of strip 10 passing through the work rolls 14 in one second will result in the entry tachometer PT1 generating 10,000 pulses which are accumulated in the entry register and the exit tachometer PT2 generating 11,000 pulses which are accumulated in the exit register. Under these assumed conditions with the extension register EXT CTR beginning at zero, the actual extension, or percent extension of strip 10 is $$11,000 - 10,000/11,000 = 9.0909\%$$

The time required for the extension register EXT CTR to reach its preset count of 100,000 is 10/100,000 equals 0.1 seconds. During 0.1 seconds the entry tachometer PT1 will generate 0.1 times 10,000 equals 1,000 pulses and the exit tachometer PT2 will generate 0.1 times 11,000 equals 1,100 pulses. The exit register is stopped with a count of 1,100 stored therein after 0.1 seconds when coincidence detector COMPARATOR 1 provides a signal on lead 23, and the additional time for the entry register to reach a count of 1,100 equals $(1,100 - 1,000)/10,000 = 0.01$ seconds. The entry register will continue to accumulate pulses for 0.01 seconds until coincidence detector COMPARATOR 2 detects that both entry and exit counters have accumulated 1,100 pulses, and during this 0.01 second interval the extension measuring register EXT CTR accumulates 0.01 times 1 MHz equals 10,000, or 10 percent, extension which is stored in storage register STORAGE when coincidence detector COMPARATOR 2 provides an output signal on lead 25. Thus after the first sample period, the visual read out indicator DISPLAY will show the $10,000/10^6$ equals 10 percent extension loaded into register STORAGE, and the count of 10,000 will remain in the extension measuring register EXT CTR. The signal from coincidence detector COMPARATOR 2 on lead 25 resets the pulse synchronizing network SYNC NET.

When the pulses from pulse tachometers PT1 and PT2 again coincide, the pulse synchronizing network SYNC NET generates a signal on the START lead which is coupled to the START input of all three registers so that they begin to accumulate pulses. Since the extension measuring register EXT CTR already stores a count of 10,000, coincidence detector COMPARATOR 1 will detect that the extension register EXT CTR has reached the preset count of 100,000 in $(100,000 - 10,000)/10^6$ equals 0.09 seconds. Coincidence detector COMPARATOR 1 provides a signal on lead 23 to the STOP input of the exit register after 0.09 seconds during which it accumulates 0.09 times 11,000 equals 990 counts. During this interval the entry register has accumulated 0.09 times 10,000 equals 900 pulses. The entry register continues to accumulate pulses from entry pulse tachometer PT1 for the additional time of $(990 - 900)/10,000$ equals 0.009 seconds until the count therein equals the 990 count in the exit register, at which time the coincidence detector COMPARATOR 2 provides a signal on lead 25 to stop the extension measuring register EXT CTR and load the contents thereof into the storage register STORAGE. During this 0.009 second interval the extension measuring register EXT CTR will accumulate 0.009 times $10^6$ equals 9,000 pulses, so the visual read out indicator DISPLAY will show a percent reduction, or extension of 9,000/100,000 equals 9 percent after the second reading, and the count of 9,000 will remain in the extension measuring register EXT CTR.

When the pulses from pulse tachometer PT1 and PT2 again coincide, the pulse synchronizing network SYNC NET will provide a signal on the START lead which will initiate counting by all three registers simultaneously. Since the count of 9,000 is stored in the extension measuring register EXT CTR initially, the register reaches its preset count of 100,000 in $(100,000 - 9,000)/10^6$ equals 0.091 seconds. During this 0.091 second interval the exit register has accumulated 0.091 times 11,100 equals 1,001 counts from pulse tachometer PT2 and the entry counter has accumulated 0.091 times 10,000 equals 910 pulses from pulse tachometer PT1. After coincidence detector COMPARATOR 1 has applied a signal to lead 23 to stop the exit register, the entry register will continue to accumulate pulses for a period of $(1,001 - 910)/10,000$ equals 0.0091 seconds. During this interval the extension measuring register EXT CTR has accumulated 0.0091 times $10^6$ equals 9,100 counts, and this count is loaded into the storage register STORAGE when the coincidence detector COMPARATOR 2 detects that both entry and exit registers have counted to 1,001 and applies a signal to lead 25. The visual read out indicator DISPLAY then displays the percent reduction 9,100/100,000 equals 9.1 percent loaded into the storage register, and the count of 9,100 remains stored in the extension measuring register EXT CTR after the third sampling.

When the pulses from pulse tachometers PT1 and PT2 again coincide, the pulse synchronizing network SYNC NET applies a signal to the START lead to initiate accumulation of pulses by all three registers. Inasmuch as the count of 9,100 is stored in the extension measuring register EXT CTR, it will reach the preset count of 100,000 in $(100,000 - 9,100)/10^6$ equals 0.0909 seconds. During this interval, the exit register has accumulated 0.0909 times 11,000 equals 9,999 counts and the entry counter has accumulated 0.0909 times 10,000 equals 9,090 counts. After coincidence detector COMPARATOR 1 has detected that the extension measuring register EXT CTR has reached its preset count of 100,000 and applied on a signal on lead 23 to stop the exit register, the entry register will continue to accumulate pulses for a period of $9,999 - 9,090/10,000$ equals 0.00909 seconds until coincidence detector COMPARATOR 2 senses that both exit and entry registers have accumulated 9,999 pulses and provides an output signal on lead 25. During this interval of 0.00909 seconds the extension measuring register has accumulated 0.00909 times $10^6$ equals 9,090 pulses which are transferred to the storage register STORAGE so that the visual read out indicator DISPLAY shows the percent reduction, or extension to be 9.09 percent. It will note that the displayed extension of 9.09 percent accurately indicates the actual extension of 9.0909 percent.

The disclosed extensometer has an accuracy in the order of ± ½ pulse time/0.1 seconds and this is dependent upon strip speed. Assuming a tachometer pulse rate of 10 KHz at top speed of steel strip 10, which is equivalent to 1/10,000 second per tachometer pulse cycle, the accuracy equals approximately:

½ times 1/10,000 × 1/0.1 equals 0.0005 or 0.05%

It will be noted that the percent extension indication is updated approximately every 0.1 second when the extension measuring register has accumulated 100,000 counts and that this sample time, or interval between updating, is independent of the speed of steel strip 10.

While only a single embodiment of my invention has been illustrated and described, many modifications and variations thereof will be readily apparent to those skilled in the art, and consequently, it should be understood that I do not intend to be limited to the particular embodiment shown and described.

The embodiments of the invention in which an exclusive property or privilege is claimed are defined as follows:

1. In the method of determining the amount of extension in a strip passing through a rolling mill by entry and exit pulse tachometers driven by entry and exit rolls prior to entry and subsequent to exit of said strip from said mill in entry and exit counters respectively, the improvement comprising repeatedly accumulating in a preset extension measuring counter the number of pulses generated by a pulse clock,
    stopping said exit counter and resetting said extension measuring counter to zero each time said extension measuring counter accumulates the preset number of pulses, and
    reading out the number of clock pulses accumulated in said extension measuring counter in the interval between stopping of said exit counter and coincidence of the counts stored in said entry and exit counters as an indication of the amount of extension of said strip.

2. In the method of determining the amount of extension in a strip passing through a rolling mill by entry and exit pulse tachometers driven by entry and exit rolls prior to entry and subsequent to exit of said strip from said mill in entry and exit counters respectively, the improvement comprising repeatedly accumulating in a preset extension measuring counter the number of pulses generated by a pulse clock, stopping said exit counter and resetting said extension measuring counter to zero each time said extension measuring counter accumulates the preset number of pulses, reading out the number of clock pulses accumulated in said extension measuring counter in the interval between stopping of said exit counter and coincidence of the counts stored in said entry and exit counters as an indication of the amount of extension of said strip, and stopping said extension measuring counter and resetting said entry and exit counters to zero concurrently with said read out step and subsequent thereto simultaneously starting counting by said exit and entry and extension measuring counters with said extension measuring counter having said number of read out clock pulses stored therein.

3. In the method of claim 1 wherein said read out step includes transferring to a storage register the number of clock pulses stored in said extension measuring counter when the counts in said entry and exit counters coincide.

4. In the method of claim 2 wherein said step of starting counting includes simultaneously initiating counting by said entry and exit and extension measuring counters upon coincidence of pulses from said entry and exit pulse tachometers.

5. In the method of determining the amount of extension in a strip passing through a rolling mill by counting the number of pulses generated by pulse tachometers driven by entry and exit rolls prior to entry of and subsequent to exit of said strip from said mill in entry and exit counters respectively the improvement comprising repeatedly accumulating in a preset extension measuring counter the number of pulses generated by a pulse clock, resetting said extension measuring counter to zero and stopping said exit counter each time said extension measuring counter has accumulated the preset number of pulses, continuing to accumulate pulses in said extension measuring and entry counters subsequent to said last step and, upon coincidence of counts in said entry and exit counters, stopping said extension measuring counter and resetting said entry and exit counters to zero and reading out the count stored in said extension measuring counter as an indication of the amount of extension, and simultaneously starting counting again by said entry and exit and extension measuring counters with the read out count stored in said extension measuring counter.

6. In the method of claim 5 wherein said starting counting step includes initiating counting by said entry and exit and extension measuring counters when pulses from said entry and exit tachometers coincide.

7. In the method of determining the percent extension in a strip passing through a rolling mill by counting the number of pulses generated by entry and pulse tachometers driven by entry and exit rolls prior to entry and subsequent to exit of said strip from said mill in entry and exit counters respectively, the improvement comprising repeatedly accumulating pulses from a pulse clock in a preset extension measuring counter to establish time intervals which are independent of the speed of said strip and measuring the difference in the number of pulses accumulated by said entry and exit counters during each of successive said time intervals so established as an indication of percent extension of said strip, and decreasing each said time inteval by the percent extension indicated during the preceding time interval by initiating counting simultaneously by said entry and exit and extension measuring counters with a count stored in said extension measuring counter which is a function of the percent extension indicated in the preceding time interval.

8. In the method of claim 7 wherein said difference measuring step includes stopping said exit counter and resetting said extension measuring counter to zero when the preset number of clock pulses is accumulated in said extension measuring counter and accumulating said clock pulses in said extension measuring counter in the period between the stopping of said exit counter and the coincidence of counts stored in said entry and exit counters as an indication of percent extension of said strip.

9. In the method of determining the amount of extension in a strip passing through a rolling mill by counting the number of pulses generated by entry and exit pulse tachometers driven by entry and exit rolls prior to entry of and subsequent to exit of said strip from said mill in entry and exit counters respectively, the improvement comprising measuring the difference in the number of pulses accumulated by said entry and exit counters during each of successive time intervals which intervals are independent of the speed of said strip as an indication of percent extension of said strip by repeatedly accumulating pulses from a pulse clock in a preset extension measuring counter, stopping said exit counter and resetting said extension measuring counter to zero when the preset number of clock pulses is accumulated in said extension measuring counter, accumulating clock pulses in said extension measuring counter in the period between the stopping of said exit counter and the coincidence of counts stored in said entry and exit counters; stopping said extension measuring counter and resetting said entry and exit counters to zero and reading out the count stored in said extension measuring counter upon said coincidence of counts in said entry and exit counters, and decreasing each said time interval by the percent extension indicated during the preceding time interval by simultaneously initiating counting by said entry and exit and extension measuring counters subsequent to said read out step with said read out count stored in said extension measuring counter.

10. In the method of claim 9 wherein said reading out step includes transferring said number of clock pulses accumulated in said extension measuring counter to a storage register.

11. In the method of determining the amount of extension in a strip passing through a rolling mill by counting the number of pulses generated by entry and exit pulse tachometers driven by entry and exit rolls prior to entry of and subsequent to exit of said strip from said mill in entry and exit counters respectively, the improvement comprising accumulating pulses from said pulse tachometers in said entry and exit counters during each of successive time intervals which are independent of the speed of the strip, stopping said exit counter at the end of each said time interval, accumulating pulses from a pulse clock in a register during the period between stopping of said counter and coincidence between the counts stored in said entry and exit counters, and reading out the clock pulses accumulated in said register during said period as an indication of the amount of extension of said strip.

12. In an extensometer for determining the amount of extension of a strip passing through a rolling mill having entry and exit rolls over which said strip passes prior to entry and subsequent to exit of said strip from said mill and entry and exit pulse tachometers driven by said entry and exit rolls and entry and exit counters coupled to said entry and exit pulse tachometers respectively, the improvement comprising, a pulse clock, a preset extension measuring counter coupled to said clock for accumulating pulses therefrom, means for stopping said exit counter and for resetting said extension measuring counter to zero when said extension measuring counter accumulates the preset number of pulses, means responsive to coincidence of counts stored in said entry and exit counters for reading out the number of pulses accumulated in said extension measuring counter as an indication of the amount of extension of said strip, means responsive to coincidence of counts stored in said entry and exit counters for resetting said entry and exit counters to zero and for stopping said extension measuring counter, and means operable subsequent to actuation of said read out means for simultaneously initiating counting by said entry and exit and extension measuring counters with the read out number of pulses remaining in said extension measuring counter.

13. In an extensometer in accordance with claim 12 wherein said read out means includes a storage register and means for transferring the contents of said extension measuring counter to said storage register upon coincidence of counts stored in said entry and exit counters.

14. In an extensometer in accordance with claim 12 wherein said means for initiating counting includes pulse synchronizing means responsive to coincidence of pulses from said entry and exit pulse tachometers for simultaneously starting counting by said entry and exit and extension measuring counters.

15. An extensometer for determining the amount of extension of a strip passing through a rolling mill comprising an entry roll over which said strip passes prior to entry into the mill, an exit roll over which said strip passes after leaving the mill, an entry pulse tachometer driven by said entry roll, an exit pulse tachometer driven by said exit roll, an entry counter connected to the output of said entry pulse tachometer, an exit counter connected to the output of said exit pulse tachometer, a pulse clock, an extension measuring counter connected to the output of said pulse clock, means to preset said extension measuring counter to a desired count, first comparator means operable when said extension measuring counter accumulates said desired count of clock pulses to stop said exit counter and to reset said extension measuring counter to zero, pulse synchronizing network means coupled to said entry and exit pulse tachometers for starting said entry, exit, and extension measuring counters to accumulate pulses when pulses from said first and second pulse tachometers coincide, storage register means connected to said extension measuring counter, second comparator means for providing an output signal when the counts accumulated in said entry and exit counters coincide, means responsive to said output signal from said second comparator means for transferring the contents of said extension measuring counter to said storage register, means responsive to said output signal from said second comparator means for resetting said entry and exit counters to zero and for resetting said synchronizing network, means responsive to said output signal from said second comparator means for stopping said extension measuring counter, and a read out device coupled to said storage register.

* * * * *

UNITED STATES PATENT OFFICE
CERTIFICATE OF CORRECTION

Patent No. 3,838,254  Dated September 24, 1974

Inventor(x) Allan C. Halter

It is certified that error appears in the above-identified patent and that said Letters Patent are hereby corrected as shown below:

Column 4, line 47, "10/100,000" should read --- $10^5/10^6$ ---.
Column 5, line 45, "11,100" should read --- 11,000 ---.
Column 6, line 4, "9,999" should read --- 999 ---; line 6, "9,090" should read --- 909 ---; lines 11-12, "9,999 - 9,090/10,000 equals 0.00909 seconds" should read --- 999 - 909/10,000 equals 0.009 seconds ---; line 14, "9,999" should read --- 999 ---; line 16, "0.00909" should read --- 0.009 ---; line 17, "0.00909 times $10^6$ equals 9,090" should read --- 0.009 times $10^6$ equals 9,000 ---; line 21, "9.09" should read --- 9.0 ---; line 22, "9.09" should read --- 9.0 ---.

Column 8, line 9, "inteval" should read --- interval ---
Column 9, line 8, after "said" --- exit --- should be inserted.

Signed and sealed this 7th day of January 1975.

(SEAL)
Attest:

McCOY M. GIBSON JR.
Attesting Officer

C. MARSHALL DANN
Commissioner of Patents